United States Patent
Park et al.

(10) Patent No.: US 7,792,354 B2
(45) Date of Patent: Sep. 7, 2010

(54) APPARATUS AND METHOD FOR REPRODUCING SKIN COLOR IN VIDEO SIGNAL

(75) Inventors: Du-sik Park, Kyungki-do (KR); Chang-yeong Kim, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1088 days.

(21) Appl. No.: 10/724,050

(22) Filed: Dec. 1, 2003

(65) Prior Publication Data

US 2004/0114798 A1 Jun. 17, 2004

(30) Foreign Application Priority Data

Dec. 14, 2002 (KR) ............... 10-2002-0080060

(51) Int. Cl.
*G06K 9/00* (2006.01)
(52) U.S. Cl. ........................................ 382/167
(58) Field of Classification Search ............. 382/162, 382/167
See application file for complete search history.

(56) References Cited

U.S. PATENT DOCUMENTS

| | | | |
|---|---|---|---|
| 3,253,305 A | 5/1966 | Granath | |
| 3,729,578 A | 4/1973 | Slusarski | |
| 3,748,825 A | 7/1973 | Chant, Jr. | |
| 3,873,760 A | 3/1975 | Worden | |
| 4,327,374 A | 4/1982 | Matsuda et al. | |
| 5,130,935 A | 7/1992 | Takiguchi | |
| 5,381,185 A | 1/1995 | Ohki et al. | |
| 5,384,601 A * | 1/1995 | Yamashita et al. | .......... 348/577 |
| 5,585,860 A | 12/1996 | Takeshima | |
| 6,272,239 B1 | 8/2001 | Colla et al. | |
| 2001/0005222 A1 | 6/2001 | Yamaguchi | |

(Continued)

FOREIGN PATENT DOCUMENTS

EP 718808 A2 * 6/1996

(Continued)

OTHER PUBLICATIONS

Kahn et al. "Adaptive video encoding based on skin tone region detection" Students Conference, ISCON '02. Proceedings. IEEE vol. 1, Aug. 16-17, 2002 pp. 129-134 vol. 1.*

(Continued)

*Primary Examiner*—Bhavesh M Mehta
*Assistant Examiner*—Sean Motsinger
(74) *Attorney, Agent, or Firm*—Staas & Halsey LLP

(57) ABSTRACT

Provided is an apparatus and a method for reproducing skin color in a video signal, which when the value of a color difference signal in an input video signal is included in an an atypical skin color (hereinafter called 'atypical color') area, based on a fact that an area corresponding to a skin color in chromaticity coordinates is divided into a typical skin color (hereinafter called 'typical color') area and an a typical color area, standardizes the value of a color difference signal included in an a typical color area as a typical color area other than a specific color, based on a memory color in which a typical color is regarded to be more natural, thereby improving reproduction quality of skin color.

20 Claims, 5 Drawing Sheets

U.S. PATENT DOCUMENTS

2003/0016866 A1* 1/2003 Cooper et al. ............... 382/167

FOREIGN PATENT DOCUMENTS

| EP | 0 886 437 A1 | 12/1998 |
| EP | 1 385 331 A2 | 1/2004 |
| JP | 6078320 | 3/1994 |
| JP | 11-275377 | 10/1999 |
| JP | 2001-186323 A | 7/2001 |
| WO | 01/78372 A2 | 10/2001 |
| WO | WO 0178372 A2 * | 10/2001 |

OTHER PUBLICATIONS

Japanese Office Action, dated Oct. 5, 2005.

Peter Bodrogi et al., Colour Memory for Various Sky, Skin, and Plant Colours: Effect of the Image Context, Color research and application, Aug. 2001, pp. 278-289, vol. 26, No. 4, Veszprem, Hungary.
* Cited in attached Korean Office Action with English Translation, Nov. 16, 2004.
Official Action issued by the Japanese Patent Office on Dec. 19, 2006, in corresponding Japanese Application No. 2003-416873, and partial English translation thereof.
Yoichi, Miyake, "*Interpretation and Evaluation of Digital Color Image*", Feb. 25, 2000, pp. 172-174, Foundation Tokyo University Publication Association, JP.
European Search Report for EP 03 25 7515, dated May 29, 2007.
Chinese Second Office Action for Application No. 200310118863.0 dated Jul. 20, 2007 with English translation.

* cited by examiner

APPARATUS AND METHOD FOR REPRODUCING SKIN COLOR IN VIDEO SIGNAL

BACKGROUND OF THE INVENTION

This application claims the priority of Korean Patent Application No. 2002-80060, filed on Dec. 14, 2002, in the Korean Intellectual Property Office, the disclosure of which is incorporated herein in its entirety by reference.

1. Field of the Invention

The present invention relates to an apparatus and a method for reproducing a skin color in a video signal, and more particularly, to an apparatus and a method for improving the quality of reproducing a skin color in a video signal, with standardizing the value of a color difference signal in an a typical skin color (hereinafter called 'atypical color') area as the value of a color difference signal in a typical skin color (hereinafter called 'typical color') area, based on a memory color.

2. Description of the Related Art

The human optic nerve is very sensitive to skin color reproduced by a video display. Thus, human eyes immediately sense even a slight variation or abnormality when skin color is reproduced. For this reason, it is regarded that skin color reproduction capability greatly influences image quality of a display. There has been a great deal of research into optimizing reproduction of skin color. Further, as today's displays are digital, an image of high quality is required, and for this reason, optimization of reproduction of skin color is very important.

Prior art related to skin color reproduction includes a method for reproducing skin color by determining a skin-color-area using a color signal phase of an input image signal and phase shifting or adjusting amplitude of a color signal (U.S. Pat. Nos. 3,748,825, 3,729,578, 3,873,760, and 4,327,374), a method for reproducing skin color by adjusting average luminance as well as the phase and amplitude of a color signal (U.S. Pat. No. 5,585,860), and a method for reproducing skin color by determining a skin-color-area according to amplitude of a color signal and adjusting at least one of three color signals such as Red, Green, and Blue (U.S. Pat. Nos. 3,253,305 and 5,381,185). In these methods, operational convenience can be pursued, but the accuracy of determination of a skin-color-area, which is a premise of reproduction of skin color, is small. Thus, an adjustment object_color may not be a adjusted, or an adjustment non-object color may be adjusted.

Another prior art document discloses a method for reproducing skin color by detecting a skin-color-area using fuzzy modeling by hue, saturation, and luminance of a video signal and adjusting saturation and luminance of the video signal (U.S. Pat. No. 6,272,239). A one-dimensional skin-color model is used in this method. Thus, the accuracy of a skin-color-area is small, and an undesirable color may be adjusted.

Another prior art document discloses an approach that is different from the above-mentioned prior art. It discloses a method for reproducing skin color, in which a specific color of a typical color of skin is designated in advance in chromaticity coordinates, a square area within a proper range centering on the specific color is determined as a skin-color-area, and all colors within the square area are adjusted as the specific color (U.S. Pat. No. 5,384,501). This method has the following problems. First, a distribution of actual skin colors in chromaticity coordinates has a nearly circular or oval shape. But, in this method, the area of the skin color is determined as a square area. Thus, an adjustment non-object color may be adjusted, as in the above-mentioned technologies. Second, according to recent research results (entitled "Colour Memory for Various Sky, Skin and Plant Colour-Effect of the Image Context", COLOR research and application, Peter Bodrogi, August 2001, No. 4, Vol. 26), a case where a color within a typical color area is not adjusted as a specific color is more suitable for human visual characteristics. In this method, even this case, all colors are adjusted as the specific color. Thus, reproduction quality of skin color may be lowered. In addition, the method comprises changing brightness of skin color into a specific and typical brightness value. In this case, brightness of a specific pixel may be lowered.

SUMMARY OF THE INVENTION

The present invention provides an apparatus and a method for reproducing a skin color in a video signal, and more particularly, to an apparatus and a method for improving the quality of reproducing a skin color in a video signal, with standardizing the value of a color difference signal in an a typical color area as the value of a color difference signal in a typical color area, based on a memory color.

According to an aspect of the present invention, an apparatus for reproducing skin color in a video signal includes an input pixel value position discriminating unit which discriminates whether a value of an input pixel is in an a typical skin color (hereinafter called 'atypical color') area of a skin-color-area in chromaticity coordinates, and a standardization pixel value obtaining unit which if it is discriminated that the value of the input pixel is in the a typical color area, adjusts the value of the input pixel so that the value of the input pixel approaches a typical skin color (hereinafter called 'typical color') area of the skin-color-area, and obtains a standardized value of the input pixel. Also, the apparatus further includes a brightness strengthening unit which adjusts a brightness value Y of the input pixel and generates a strengthened value Ya of a brightness signal.

According to another aspect of the present invention, a method for reproducing skin color in a video signal includes (a) discriminating whether a value of an input pixel is in an a typical skin color (hereinafter called 'atypical color') area of a skin-color-area in chromaticity coordinates, and (b) if it is discriminated that the value of the input pixel is in the a typical color area, adjusting the value of the input pixel so that the value of the input pixel approaches a typical skin color (hereinafter called 'typical color') area of the skin-color-area, and obtaining a standardized value of the input pixel.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
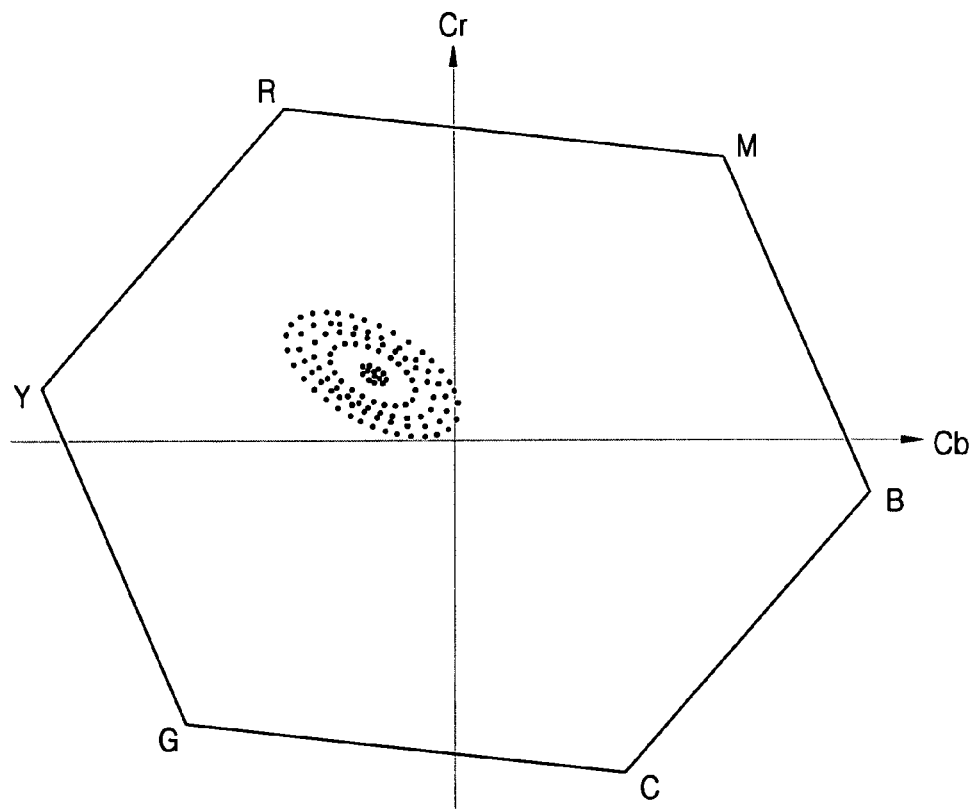
FIG. 1 shows the skin color area indicated in chromaticity coordinates.

Hereinafter, the structure, operation, and preferred embodiments of the present invention will be described in detail with reference to the accompanying drawings. Like reference numerals refer to like elements.

According to the present invention, a skin color area is determined by squared Mahalanobis distance formula which expresses the constant density contour of a regular distribution probability density function. The premise of determining the skin color area using the formula is that the distribution of an actual skin color on a chromaticity coordinate is modeled by two-variable regular distribution.

In FIG. 1, an area of skin color indicated in chromaticity coordinates is shown as a distribution of points. The x-axis of the graph of FIG. 1 represents a color signal Cb, and the y-axis represents a color signal Cr. In FIG. 1, R represents the position of Red, G represents the position of Green, B represents the position of Blue, C represents the position of Cyan, M represents the position of Magenta, and Y represents the position of Yellow.

Figure 2:
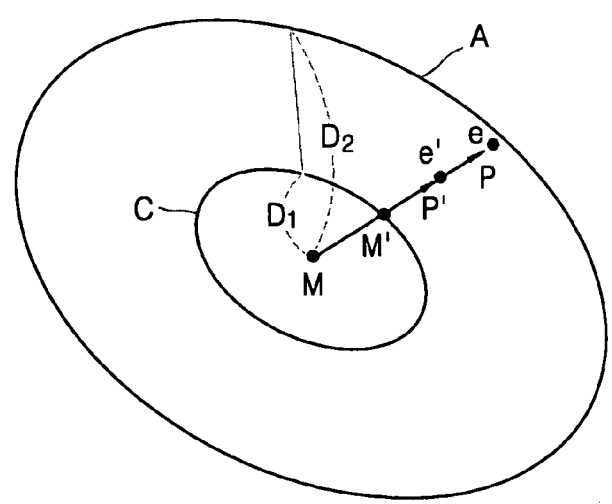
FIG. 2 is an enlarged drawing of the skin color area of FIG. 1.

FIG. 2 is an enlarged drawing of the skin color area of FIG. 1. Referring to FIG. 2, an area of a skin color in chromaticity coordinates is divided into a typical skin-color-area (typical color area, inside inner oval) and an a typical skin-color-area (a typical color area, between outer and inner ovals) which surrounds the typical skin-color-area. In the present invention, an input pixel value is adjusted so that P approaches P', that is, a pixel existing in the a typical color area approaches the typical color area using this distribution model of skin color, thereby reproducing skin color as a standardized value of an input pixel.

With respect to standardization, the present invention is different from the above-mentioned U.S. Pat. No. 5,384,601 in that standardization of an input pixel is based on a predetermined area, i.e., the typical color area not just a single point, to reflect human visual characteristics. Thus, the problem of the prior art in which an input pixel is standardized based on a single point and human visual characteristics cannot be reflected, is solved. Specifically, the input pixel is standardized as the predetermined area, not just the single point.

In FIG. 2, A represents an outermost contour of a skin-color-area, and C represents an outermost contour of a typical color area. P represents a point with coordinates Cbi and Cri of the color difference signals of an input pixel, and P' represents a standardized point with coordinates Cba and Cra of color difference signals of an input pixel after the coordinates of the input pixel Cbi and Cri are adjusted. M represents a point with average coordinates of a typical color, and M' represents a point where a line running through M and P intersects C. e represents a vector which is placed toward P centering on M', and e' represents a vector which is placed toward P' centering on M'. D1 represents a distance between M and C, i.e., the approximate width of the typical color area, and D2 represents a distance between M and A, i.e., the approximate width of the skin-color-area.

Figure 3A:
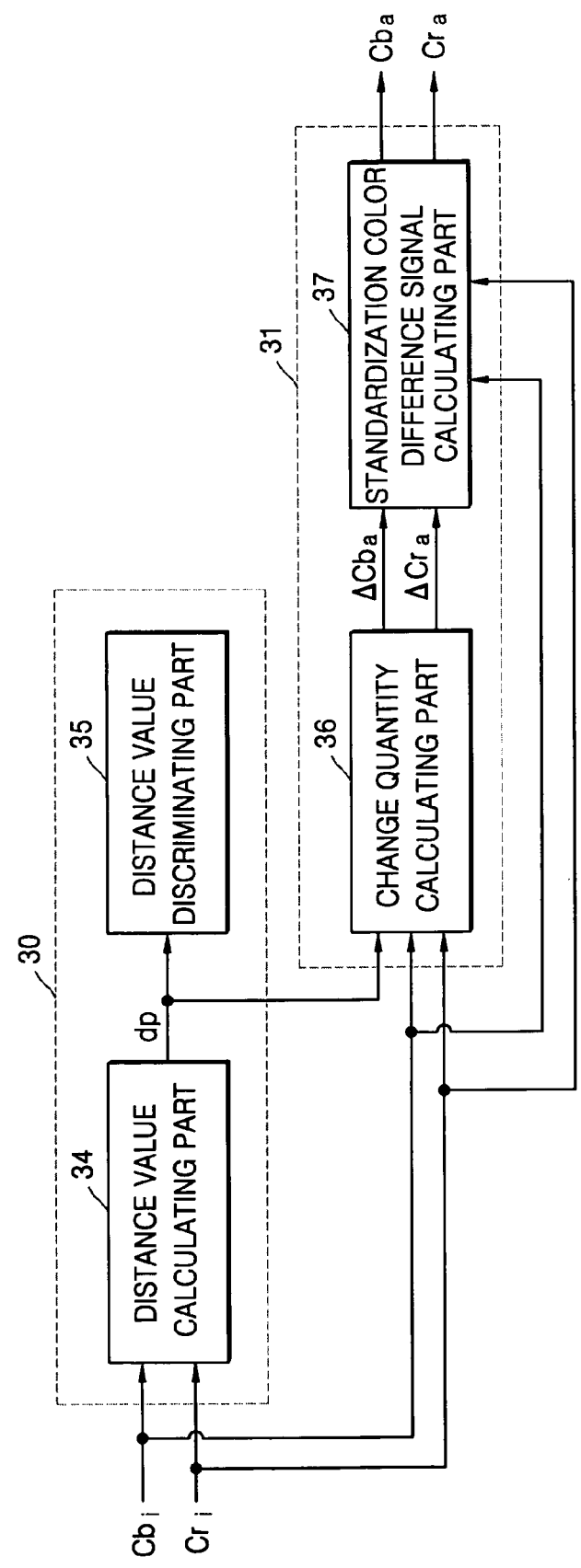
FIG. 3A shows the structure of an apparatus for reproducing skin color in a video signal according to the present invention.

FIG. 3A shows the structure of an apparatus for reproducing skin color in a video signal according to the present invention.

The apparatus for reproducing skin color in a video signal according to the present invention largely includes two elements: an input pixel value position discriminating unit 30 comprising a distance value calculating part 34 which calculates a distance between a point P in chromaticity coordinates corresponding to values of two color difference signals of an input pixel, and a point M for which average values of the two color difference signals of the typical color area are used, a distance value discriminating part 35 which discriminates whether the distance value is within the typical color area or the a typical color area; a standardization pixel value obtaining unit 31 comprising a change quantity calculating part 36 which calculates standardized change quantities $\Delta Cba$ and $\Delta Cra$ of the values of the color difference signals of the input pixel from an outermost value of a color difference signals in the typical color area, and a standardization color difference signal calculating part 37 which calculates standardized values Cba and Cra of the values of color difference signals of an input pixel using the standardized change quantities $\Delta Cba$ and $\Delta Cra$.

The distance value calculating part 34 calculates a distance value dp between the point P with the chromaticity coordinates Cbi and Cri of color difference signals of an input pixel, and the point M whose coordinates are average values of the two color difference signals of the typical color area. The distance value discriminating part 35 discriminates whether the distance value dp is within the width value of the typical color area or the a typical color area. The change quantity calculating part 36 calculates standardized change quantities $\Delta$ and $\Delta Cra$ of the values of the color difference signals of the input pixel when the distance value dp is within the typical color area and the a typical color area. The standardization color difference signal calculating part 37 calculates standardized values Cba and Cra of color difference signals of the input pixel using standardized change quantities $\Delta Cba$ and $\Delta Cra$.

An embodiment of the present invention will be described in detail with reference to FIG. 3B.

Figure 3B:
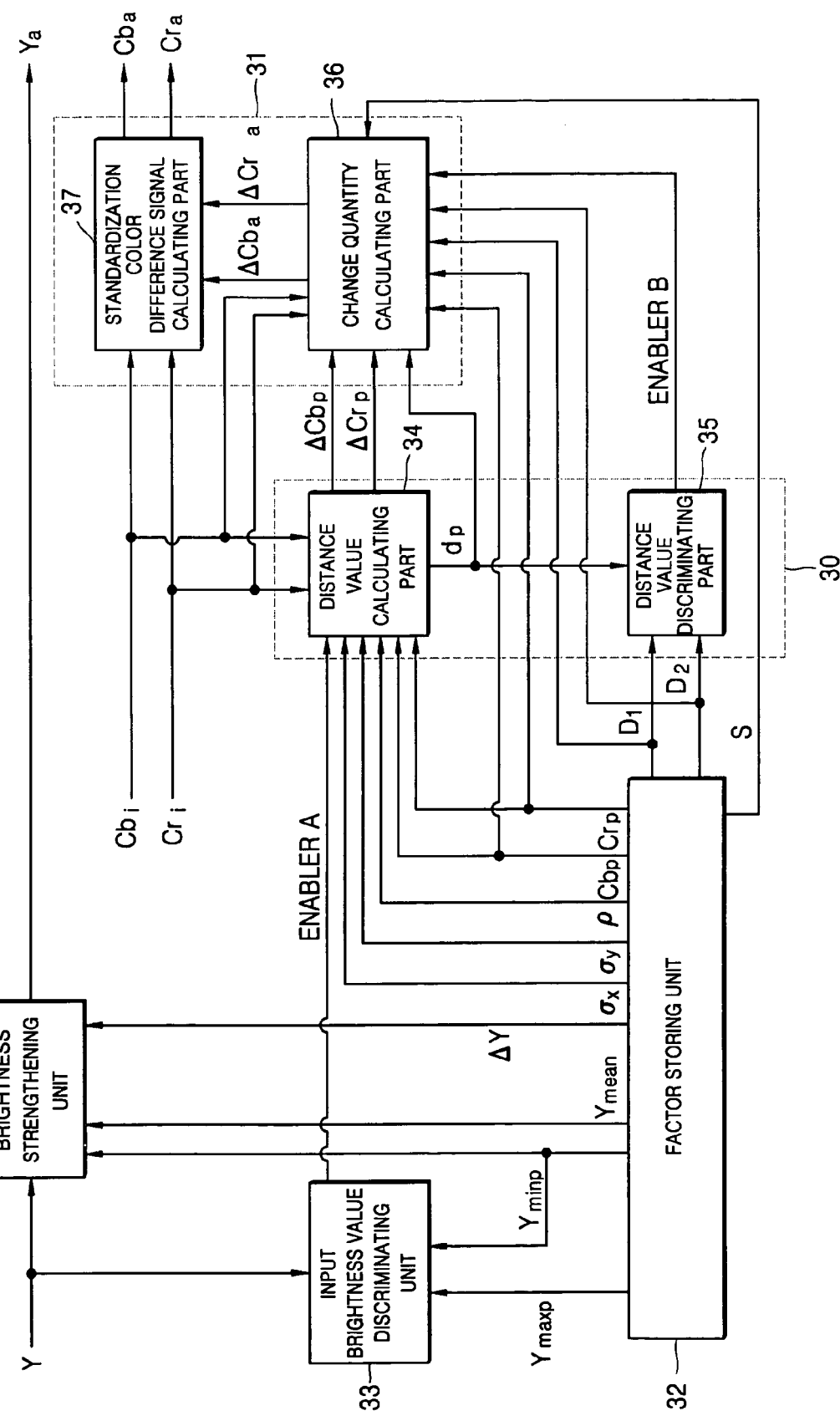
FIG. 3B shows the detailed structure of the apparatus for reproducing skin color in a video signal according to an embodiment of the present invention.

FIG. 3B shows the detailed structure of the apparatus for reproducing skin color in a video signal according to an embodiment of the present invention. Referring to FIG. 3B, a factor storing unit 32 stores factors, used in elements which will be mentioned later, such as a maximum brightness value Ymaxp of skin color, a minimum brightness value Yminp of the skin color, an average brightness value Ymean of the skin color, a change quantity constant $\Delta Y$ of the brightness value of the skin color, a standard deviation $\sigma x$ of the value of the color difference signal Cb of the typical color, a standard deviation $\sigma y$ of the value of a color difference signal Cr of the skin color, a correlation coefficient p between the color difference signals Cr and Cb, an average value Cbp of the color difference signal Cb of the typical color, an average value Crp of the color difference signal Cr of the skin color, a distance D1 between the point M of the average value of the two color difference signals and the outermost contour of the typical color area, a distance D2 between the point M and the outermost contour of the skin-color-area, and a strength constant s.

An input brightness value discriminating unit 33 receives brightness values Ymaxp and Yminp of the skin color received from the factor storing unit 32 and discriminates whether a brightness value Y of the input pixel satisfies Y min p$\leq$Y$\leq$Y max p. If the brightness value Y of the input pixel does not satisfy the above conditions, this means that the brightness value of the input pixel is not in the range of the brightness value of the skin color. Thus, the input brightness value discriminating unit 33 discriminates whether a brightness value Y of a next input pixel satisfies the above inequality. The range of the brightness value of the skin color is experimentally determined. As an example, the range of the brightness value of the skin color may be determined by evaluating the brightness of the skin color in a set of video chips photographed under various illumination conditions. When the brightness value Y of the input pixel satisfies the above conditions, an operation starting signal Enabler A is applied to the distance value calculating part 34 so that the distance value calculating part 34 calculates the distance dp between the point P in the chromaticity coordinates of the color difference signals Cbi and Cri and the point M.

The distance value calculating part 34 receives the factors σx, σy, p, Cbp, and Crp from the factor storing unit 32 and calculates the distance dp between the point P in the chromaticity coordinates of the values Cbi and Cri of the two color difference signals and the point M. Preferably, in this case, the distance value dp is obtained by Equation 1.

$$dp = \frac{1}{1-p^2}\left[\left(\frac{\Delta Cbp}{\sigma x}\right)^2 - 2p\left(\frac{\Delta Cbp}{\sigma x}\right)\left(\frac{\Delta Crp}{\sigma y}\right) + \left(\frac{\Delta Crp}{\sigma y}\right)^2\right] \quad (1)$$

Here, dp is called a squared Mahalanobis distance and is the distance between two groups having constant covariance matrices and different average values. Square means a constant density contour of a regular distribution probability density function of the skin-color-area modeled using the two-variable regular distribution. Euclid distance is a distance from a plane, and squared Mahalanobis distance is a distance considering increase and decrease in a mountain slope.

The distance value discriminating part 35 receives the factors D1 and D2 from the factor storing unit 32 and discriminates whether the distance value dp satisfies D1≦dp≦D2. That is, the distance value discriminating part 35 discriminates whether the values of the color difference signals of the input pixel are between the outermost contour C of the typical color and the outermost contour A of the skin-color-area. As a result of discrimination, a standardization subject pixel does not belong to the typical color area but belongs to the skin-color-area, that is, belongs to the a typical color area. The reason why a pixel belonging to the typical color area is not standardized is described above. That is, if the pixel belonging to the typical color area is adjusted as a single color, human visual characteristics cannot be reflected. Accordingly, in the present embodiment, when the input pixel is in the typical color area, the brightness value of the input pixel and the values of the color difference signals are used without change when they are reproduced in a video display.

If the distance value dp satisfies the above inequality, an operation starting signal Enabler B is applied to the change quantity calculating part 36 from the distance value discriminating part 35. Then, the change quantity calculating part 36 obtains values of the color difference signals Cb' and Cr' of a point M' at which a straight line connecting the points M and P to each other intersects an outermost contour C in the typical color area, and calculates differences ΔCb and ΔCr (the length of the vector e) for each of the difference signals between the point M' and the point P. Then, the change quantity calculating part 36 calculates a distance between a point P' on a straight line placed in a distance proportional to a standardization index ω assigned to the differences ΔCb and ΔCr and the point M' for standardization of the values Cbi and Cri and calculates standardized change quantities ΔCba and ΔCra (the length of a vector e') of the values Cbi and Cri from the outermost contour in the typical color area.

The values Cb' and Cr' of the two color difference signals Cb and Cr are given by Equations 2.

$$\Delta Cb' = \Delta Cbp * \frac{D1}{dp} \quad \Delta Cr' = \Delta Crp * \frac{D1}{dp} \quad (2)$$

$$Cb' = Cbp + \Delta Cb' \quad Cr' = Crp + \Delta Cr'$$

Here, ΔCbp and ΔCrp represent differences between the average values Cbp and Crp of the color difference signals Cb and Cr at the point M and the values Cbi and Cri of the color difference signals Cb and Cr at the point P. ΔCb' and ΔCr' represent differences between the average values Cbp and Crp and the values Cb' and Cr' of the color difference signals Cb and Cr at the point M'.

Preferably, the differences ΔCb and ΔCr for each of the difference signals between the point MΔ and the point P are obtained by Equations 3.

$$\Delta Cb = Cbi - Cb' \quad \Delta Cr = Cri - Cr' \quad (3)$$

Here, ΔCb and ΔCr should be adjusted for standardization of the values Cri and Cbi. For adjustment, a standardization index ω is assigned to ΔCb and ΔCr. Preferably, ω is obtained by Equations 4.

$$D' = D2 - D1 \quad d = dp - D1 \quad a(d) = s + \left[\frac{1-s}{D'}\right]d \quad (4)$$

$$\omega = \sqrt{a(d)}$$

Here, s is a value set in the factor storing unit 32, and is called a strength constant, and corresponds to an initial value (or offset) of the standardization index ω. a(d) is a linear function and is used as a functional parameter for introduction of ω. ω is between 0 and 1.

If ω is obtained, ΔCba and ΔCra are obtained by Equations 5.

$$\Delta Cba = \omega \Delta Cb \quad \Delta Cra = \omega \Delta Cr \quad (5)$$

The standardization color difference signal calculating part 37 calculates the standardized values Cba and Cra of the color difference signals of the input pixel using ΔCba and ΔCra. The values Cba and Cra are obtained by Equations 6.

$$Cba = Cb' + \Delta Cba - Cra = Cr' + \Delta Cra \quad (6)$$

As a result, the values Cbi and Cri are changed into the standardized values Cba and Cra, and the standardized values Cba and Cra are reproduced as color difference signals of a video display.

The apparatus for reproducing skin color in a video signal according to the present invention further includes a brightness strengthening unit 38 which adjusts the brightness value Y of the input pixel using a predetermined method and generates a strengthened value Ya of a brightness signal.

In a prior-art method for reproducing skin color, a brightness signal is not adjusted, and only a color signal is adjusted to reproduce the skin color. An example of a prior-art method for adjusting a brightness signal is the above-mentioned U.S. Pat. No. 5,384,601. Here, the method comprises changing a brightness value of an input pixel into a specific and typical brightness value of skin color. As a result of changing, the specific brightness value of the input pixel is reduced. In general, skin color becomes darker, that is, the brightness value of the skin color decreases, due to a secondary effect caused by black level improvement for adjusting a black level in a video signal or an automatic contrast level for adjusting the beam strength of a cathode ray tube. For these reasons, strengthening the brightness value of the input pixel is necessary.

Preferably, when the brightness value Y is smaller than an average value of a general brightness value of skin color, a value which is obtained by dividing ($\Delta Y$+Ymean−Yminp) by (Ymean−Yminp) is assigned to Y as a coefficient w11, and then, a corrected value w12 of the minimum brightness value Yminp is added to w11×Y as an offset, thereby obtaining Ya.

When the brightness value Y is larger than an average value of a general brightness value of skin color, a value which is obtained by dividing (Ymaxp−Yminp−$\Delta Y$) by (Ymaxp−Yminp) is assigned to Y as a coefficient w21, and then, a corrected value w22 of the maximum brightness value Ymaxp is assigned to w21×Y as an offset, thereby obtaining Ya. The above is shown in Equations 7.

$$\text{if } Y\min p < Y < Y mean: \quad (7)$$
$$Y_a = \omega 11 \times Y + \omega 12$$
$$\omega 11 = \frac{Ymean - Y\min p + \Delta Y}{Ymean - Y\min p} \quad \omega 12 = Y\min p \frac{\Delta Y}{Y\min p - Ymean}$$
$$\text{if } Ymean < Y:$$
$$Y_a = \omega 21 \times Y + \omega 22$$
$$\omega 21 = \frac{Y\max p - Y\min p - \Delta Y}{Y\max p - Y\min p} \quad \omega 22 = Y\max p \frac{\Delta Y}{Y\max p - Y\min p}$$

Here, $\Delta Y$ is an experimentally determined change quantity constant of a brightness value of skin color. In general, the value of $\Delta Y$ is 5.

Consequently, the input pixel is standardized by adjusting the values Y, Cbi, and Cri of the input pixel as Ya, Cba, and Cra to approach the typical color area, and thus, the video display can reproduce skin color using the standardized values.

A method for reproducing skin color in a video signal according to the present invention largely comprises two steps. The first step is discriminating an input pixel value position by calculates a distance between a point P in chromaticity coordinates at which values of color difference signals of an input pixel are used, and a point M at which an average value of the color difference signals of the typical color area is used, and discriminating whether the distance value is between a width value of the typical color area and a width value of the a typical color area. The second step is obtaining a standardization pixel value by calculating standardized change quantities from an outermost value of color difference signals in the typical color area of the values of the color difference signals of the input pixel and calculating standardized values Cba and Cra of color difference signals of the input pixel using the standardized change quantities.

Figure 4A:
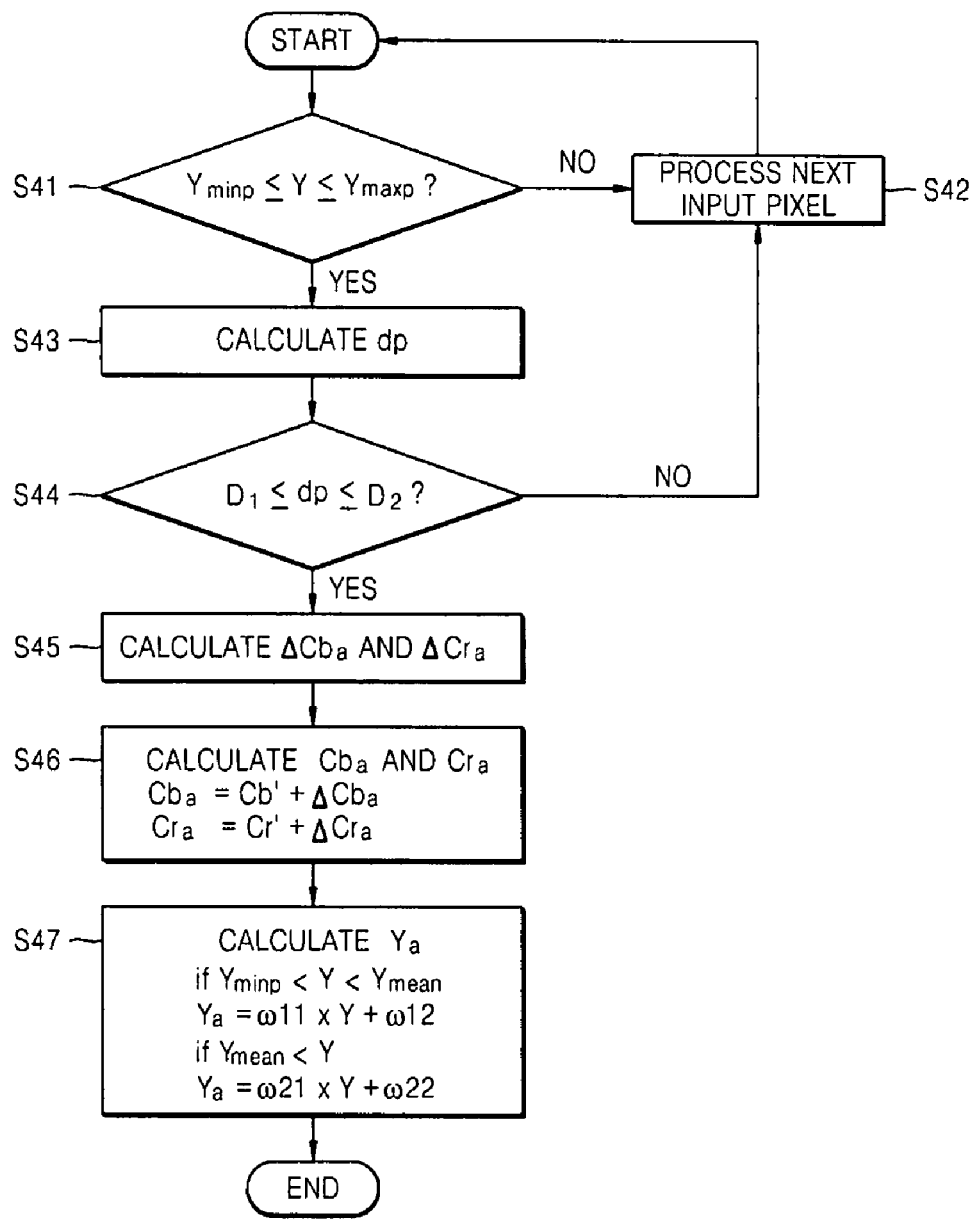
FIG. 4A is a flowchart illustrating a method for reproducing skin color in a video signal according to an embodiment of the present invention.

FIG. 4A is a flowchart illustrating a method for reproducing skin color in a video signal according to an embodiment of the present invention. Referring to FIG. 4A, by discriminating whether the brightness value Y of the input pixel is between the minimum brightness value Yminp and the maximum brightness value Ymaxp of the skin color (S41), it is discriminated whether the input pixel has a brightness value of a skin color. S41 is a first step of discriminating whether the input pixel is a standardization subject pixel. If the brightness value Y does not satisfy the above conditions, this means that the brightness value of the input pixel is not in the range of brightness values of a skin color, that is, the brightness value of the input pixel is a standardization non-subject pixel, and thus, in step S42, a next input pixel is processed.

If the brightness value Y is between the minimum brightness value Yminp and the maximum brightness value Ymaxp of the skin color, step of calculating a distance dp between a point P of the input pixel and a point M of an average value of color difference signals of a typical color (S43) is calculating a distance dp using factors such as $\sigma x$, $\sigma y$, p, Cbp, and Crp. Preferably, in this case, dp is obtained by Equation 1 presented above.

In discriminating whether the distance dp is between the width D1 of the typical color area and the width D2 of the skin-color-area (S44), the brightness value of the input pixel is first evaluated to discriminate whether the standardization subject pixel in step S41. Then, it is discriminated whether the color difference signals of the input pixel have values of standardization subject color difference signals. In step S44, the position of the point which represents the values of the standardization subject color difference signals should be between the outermost contour of the typical color area and the outermost contour of the skin-color-area. Even when the color difference signals of the input pixel satisfy the above conditions of step S41, if they do not satisfy the conditions of step (S44), the input pixel is excluded from being a standardization object. Such a standardization non-subject input pixel is a pixel that is in the typical color area or outside the skin-color-area. Thus, if the color difference signals of the input pixel are in the typical color are or outside of the skin-color-area, a next input pixel is processed in step S42.

Figure 4B:
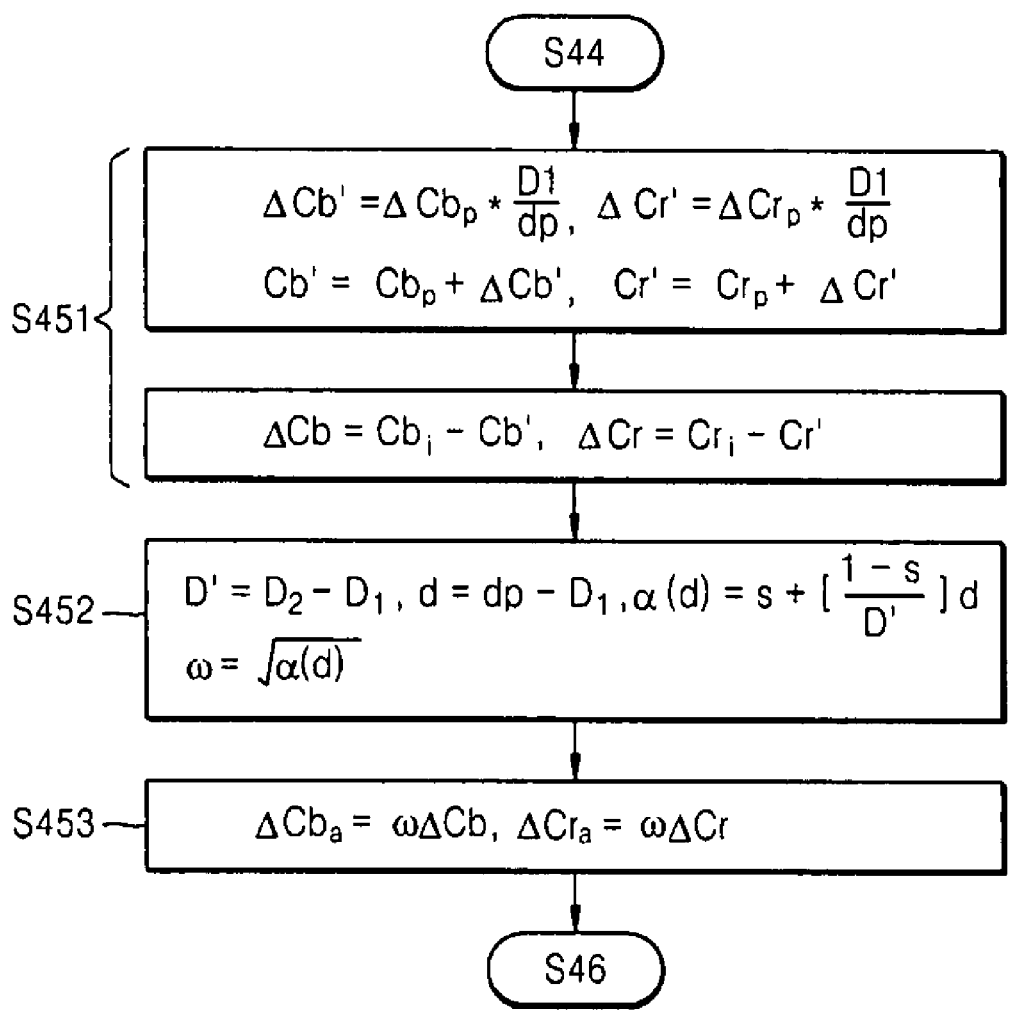
FIG. 4B is a flowchart illustrating step (S45) of FIG. 4A in detail.

When the distance dp is between the width D1 and the width D2, calculating corrected change quantities $\Delta Cba$ and $\Delta Cra$ from the outermost contour of the typical color area of the values Cbi and Cri according to a distance (d=dp−D1) between the outermost contour of the typical color area and an input pixel point (S45) is necessary to standardize the values Cbi and Cri of the color difference signals of the input pixel as the typical color area. Specifically, step S45 comprises calculating values Cb' and Cr' of color difference signals of an outermost contour point M' of the typical color area and change quantities $\Delta Cb$ and $\Delta Cr$ of the values Cbi and Cri from the values Cb' and Cr' (S451), obtaining a standardization index $\omega$ for standardization of the values Cbi and Cri (S452), and calculating the change quantities $\Delta Cba$ and $\Delta Cra$ by assigning the standardization index $\omega$ to the change quantities $\Delta Cb$ and $\Delta Cr$ (S453). In this case, each of the values defined in steps S451 through S453 may be obtained by Equations 2 through 5. The detailed steps S451 through S453 of S45 are shown in FIG. 4B.

Next, $\Delta Cba$ and $\Delta Cra$ are respectively added to the values Cbi and Cri of the color difference signals of the input pixel, so as to calculate the standardized values Cba and Cra of the color difference signals (S46).

The method for reproducing skin color in a video signal according to the present invention further comprises obtaining a strengthened brightness value Ya by changing the brightness value Y using a predetermined method (S47). The step S47 is necessary for the above-mentioned reasons, and Ya is obtained by Equations 7. Thus, detailed descriptions thereof will be omitted.

In addition, the present invention can be implemented as a computer readable code recorded on a computer readable recording medium. The computer readable recording medium may be ROM, RAM, a CD-ROM, a magnetic tape, a floppy disc, and a DVD, or may be carrier waves (i.e., transmission over the Internet). The computer readable recording medium may also be installed in a computer system that is connected to a network, and thus the computer readable codes can be stored and executed in a distributed mode.

As described above, in the apparatus and method for reproducing skin color in a video signal according to the present invention, standardization is based on a predetermined area other than a single color. Thereby, a prior-art problem that colors are adjusted to orient a single typical color and human visual characteristics cannot be reflected, is solved. In addition, during a standardization operation, a proper standardization index is assigned to a difference according to brightness value and values of color difference signals of an input pixel other than standardization by a uniform basis, such that skin color is reproduced to be more natural to human eyes, thereby improving the image quality of a digitalized video display.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for reproducing skin color in a video signal, the apparatus comprising:
    an input pixel value position discriminating unit which determines whether a value of an input pixel is in an atypical skin color (hereinafter called 'atypical color') area of a skin-color-area in chromaticity coordinates; and
    a standardization pixel value obtaining unit which, if it is determined that the value of the input pixel is in the atypical color area, adjusts the value of the input pixel so that the value of the input pixel approaches a typical skin color (hereinafter called 'typical color') area of the skin-color-area by adjusting the value of the input pixel to a standardized value obtained based on the typical color area, wherein the standardization pixel value obtaining unit receives a value of a distance between a point P in chromaticity coordinates at which values of color difference signals of the value of the input pixel are used, and a point M at which an average value of the color difference signals of the typical color area is used, and the standardization pixel value obtaining unit comprises:
    a change quantity calculating part which calculates standardized change quantities ΔCba and ΔCra of the values of the color difference signals of the value of the input pixel from an outermost value of color difference signals in the typical color area; and
    a standardization color difference signal calculating part which calculates standardized values Cba and Cra of the color difference signals of the value of the input pixel using the standardized change quantities,
    wherein the atypical color area and typical color area comprise a distribution of points.

2. The apparatus as claimed in claim 1, wherein the input pixel value position discriminating unit comprises:
    a distance value calculating part which calculates a value of a distance between a point P in chromaticity coordinates at which values of color difference signals of the value of the input pixel are used, and a point M at which an average value of the color difference signals of the typical color area is used; and
    a distance value discriminating part which discriminates whether the distance value is between a width value of the typical color area and a width value of the atypical color area.

3. The apparatus as claimed in claim 2, wherein the distance value is a squared Mahalanobis distance.

4. The apparatus as claimed in claim 1, wherein the change quantity calculating part obtains values Cb' and Cr' of the color difference signals of a point M' at which a straight line connecting the points M and P to each other intersects an outermost contour of the typical color area, calculates change quantities ΔCb and ΔCr for each of the difference signals between the point M' and the point P, assigns a standardization index ω to the ΔCb and ΔCr for standardization of the values of the color difference signals of the input pixel, calculates a distance between a point P' on a straight line placed at a distance proportional to the standardization index ω from the point M', and the point M', and calculates standardized change quantities ΔCba and ΔCra of the values of the color difference signals of the input pixel from the values Cb' and Cr'.

5. The apparatus as claimed in claim 4, wherein the values Cb' and Cr' are obtained by adding an average value of the values of the color difference signals of the typical color area to a difference of the values of the color difference signals between the points M and M'.

6. The apparatus as claimed in claim 4, wherein the standardized change quantities ΔCba and ΔCra are obtained by multiplying the differences ΔCb and ΔCr by the standardization index ω.

7. The apparatus as claimed in claim 1, wherein the standardized values Cba and Cra are obtained by adding the standardized change quantities ΔCba and ΔCra to the values Cb' and Cr', respectively.

8. The apparatus as claimed in claim 1, further comprising a brightness strengthening unit which adjusts a brightness value Y of the input pixel and generates a strengthened value Ya of a brightness signal.

9. The apparatus as claimed in claim 8, wherein when the brightness value Y is smaller than an average value of a general brightness value of skin color, a value which is obtained by dividing the sum of a difference between the average brightness value of the skin color and the minimum brightness value of the skin color and a change quantity constant of the brightness value, by a difference between the average brightness value of the skin color and the minimum brightness value of the skin color, is a proportional coefficient w11 of Y, and then, a corrected value w12 of the minimum brightness value is an offset added to w11×Y, thereby obtaining Ya;
    when the brightness value Y is larger than an average value of a general brightness value of skin color, a value which is obtained by dividing the result of subtracting a change quantity constant of the brightness value from a difference between the maximum brightness value and the minimum brightness value of the skin color, by a difference between the maximum brightness value and the minimum brightness value of the skin color, is a proportional coefficient w21 of Y, and then, a corrected value w22 of the maximum brightness value is an offset added to w21×Y, thereby obtaining Ya.

10. A method for reproducing skin color in a video signal, the method comprising:
    (a) determining whether a value of an input pixel is in an atypical skin color (hereinafter called 'atypical color') area of a skin-color-area in chromaticity coordinates; and
    (b) if it is determined that the value of the input pixel is in the atypical color area, adjusting the value of the input pixel so that the value of the input pixel approaches a typical skin color (hereinafter called 'typical color') area of the skin-color-area by adjusting the value of the input pixel to a standardized value obtained based on the typical color area, wherein when a value of a distance between a point P in chromaticity coordinates at which values of color difference signals of the value of the input pixel are used, and a point M at which an average value of the color difference signals of the typical color area is used is calculated, step (b) comprises:

(b1) calculating standardized change quantities $\Delta Cba$ and $\Delta Cra$ of the values of the color difference signals of the value of the input pixel from an outermost value of color difference signals in the typical color area; and (b2) calculating standardized values Cba and Cra of the color difference signals of the value of the input pixel using the standardized change quantities, wherein the atypical color area and typical color area comprise a distribution of points.

11. The method as claimed in claim 10, wherein (a) comprises:

calculating a value of a distance between a point P in chromaticity coordinates at which values of color difference signals of the value of the input pixel are used, and a point M at which an average value of the color difference signals of the typical color area is used; and determining whether the distance value is between a width value of the typical color area and a width value of the atypical color area.

12. The method as claimed in claim 11, wherein the distance value is a squared Mahalanobis distance.

13. The method as claimed in claim 10, wherein (b1) comprises:

obtaining values Cb' and Cr' of the color difference signals of a point M' at which a straight line connecting the points M and P to each other intersects an outermost contour in the typical color area and calculating change quantities $\Delta Cb$ and $\Delta Cr$ for each of the difference signals between the point M' and the point P; and assigning a standardization index $\omega$ to the $\Delta Cb$ and $\Delta Cr$ for standardization of the values of the color difference signals of the input pixel, calculating a distance between a point P' on the straight line placed at a distance proportional to the standardization index $\omega$ from the point M', and the point M', and calculating standardized change quantities $\Delta Cba$ and $\Delta Cra$ of the values of the color difference signals of the input pixel from the values Cb' and Cr'.

14. The method as claimed in claim 13, wherein the values Cb' and Cr' are obtained by adding an average value of the values of the color difference signals of the typical color area to a difference of the values of the color difference signals between the points M and M'.

15. The method as claimed in claim 13, wherein the standardized change quantities $\Delta Cba$ and $\Delta Cra$ are obtained by multiplying the differences $\Delta Cb$ and $\Delta Cr$ by the standardization index $\omega$.

16. The method as claimed in claim 13, wherein the standardized values Cba and Cra are obtained by adding the standardized change quantities $\Delta Cba$ and $\Delta Cra$ to the values Cb' and Cr', respectively.

17. The method as claimed in claim 10, further comprising adjusting a brightness value Y of the input pixel and generating a strengthened value Ya of a brightness signal.

18. The method as claimed in claim 17, wherein when the brightness value Y is smaller than an average value of a general brightness value of skin color, a value which is obtained by dividing the sum of a difference between the average brightness value of the skin color and the minimum brightness value of the skin color and a change quantity constant of the brightness value, by a difference between the average brightness value of the skin color and the minimum brightness value of the skin color, is a proportional coefficient w11 of Y, and then, a corrected value w12 of the minimum brightness value is an offset added to w11×Y, thereby obtaining Ya;

when the brightness value Y is larger than an average value of a general brightness value of skin color, a value which is obtained by dividing the result of subtracting a change quantity constant of the brightness value from a difference between the maximum brightness value and the minimum brightness value of the skin color, by a difference between the maximum brightness value and the minimum brightness value of the skin color, is a proportional coefficient w21 of Y, and then, a corrected value w22 of the maximum brightness value is an offset added to w21×Y, thereby obtaining Ya.

19. A non transitory computer readable medium containing program code for executing the method for reproducing skin color in a video signal as claimed in claim 10 on a computer.

20. An apparatus for reproducing skin color in a video signal, the apparatus comprising:

an input pixel value position discriminating unit to determine whether a value of an input pixel is in an atypical skin color area of a skin-color-area in chromaticity coordinates; and a standardization pixel value obtaining unit which, if it is determined that the value of the input pixel is in the atypical skin color area, adjusts the value of the input pixel so that the value of the input pixel approaches a typical skin color area of the skin-color-area by adjusting the value of the input pixel to a standardized value obtained based on the typical color area, wherein the standardization pixel value obtaining unit receives a value of a distance between a point P in chromaticity coordinates at which values of color difference signals of the value of the input pixel are used, and a point M at which an average value of the color difference signals of the typical color area is used, and the standardization pixel value obtaining unit comprises:

a change quantity calculating part which calculates standardized change quantities $\Delta Cba$ and $\Delta Cra$ of the values of the color difference signals of the value of the input pixel from an outermost value of color difference signals in the typical color area; and a standardization color difference signal calculating part which calculates standardized values Cba and Cra of the color difference signals of the value of the input pixel using the standardized change quantities.

* * * * *

UNITED STATES PATENT AND TRADEMARK OFFICE
CERTIFICATE OF CORRECTION

PATENT NO. : 7,792,354 B2  Page 1 of 1
APPLICATION NO. : 10/724050
DATED : September 7, 2010
INVENTOR(S) : Du-Sik Park et al.

It is certified that error appears in the above-identified patent and that said Letters Patent is hereby corrected as shown below:

Title Page, Item (57) (Abstract), Line 3, After "an" delete "an". (Second Occurrence)

Title Page, Item (57) (Abstract), Line 7, delete "a typical" and insert --atypical--, therefor.

Title Page, Item (57) (Abstract), Line 9, delete "a typical" and insert --atypical--, therefor.

Signed and Sealed this
Twenty-second Day of February, 2011

David J. Kappos
*Director of the United States Patent and Trademark Office*